US006957209B1

(12) United States Patent
Quernemoen

(10) Patent No.: US 6,957,209 B1
(45) Date of Patent: Oct. 18, 2005

(54) SIZING SERVERS FOR DATABASE MANAGEMENT SYSTEMS VIA USER DEFINED WORKLOADS

(75) Inventor: John M. Quernemoen, New Brighton, MN (US)

(73) Assignee: Unisys Corporation, Blue Bell, PA (US)

( * ) Notice: Subject to any disclaimer, the term of this patent is extended or adjusted under 35 U.S.C. 154(b) by 0 days.

(21) Appl. No.: 09/515,310

(22) Filed: Feb. 29, 2000

(51) Int. Cl.[7] .............................................. G06F 17/30
(52) U.S. Cl. ........................................ 707/2; 707/100
(58) Field of Search .................... 707/1–10, 100–104.1, 707/200–205; 705/1, 7, 8; 706/45, 46, 55, 60–62; 709/100, 102, 105, 200, 201, 217, 220–229; 711/100, 101; 713/1, 100; 714/1, 25, 26, 37, 46, 47, 100

(56) References Cited

U.S. PATENT DOCUMENTS

| | | | | |
|---|---|---|---|---|
| 4,495,562 A | * | 1/1985 | Yamaji et al. ............... 709/105 |
| 5,065,360 A | | 11/1991 | Kelly .......................... 395/800 |
| 5,125,088 A | * | 6/1992 | Culley .......................... 713/400 |
| 5,276,877 A | * | 1/1994 | Friedrich et al. ............. 703/13 |
| 5,617,514 A | | 4/1997 | Dolby et al. ................... 395/51 |
| 5,630,025 A | | 5/1997 | Dolby et al. ................... 395/51 |
| 5,815,662 A | * | 9/1998 | Ong ........................ 365/230.01 |
| 5,835,755 A | * | 11/1998 | Stellwagen, Jr. ................ 707/3 |
| 5,845,279 A | * | 12/1998 | Garofalakis et al. ........... 707/7 |
| 5,857,195 A | * | 1/1999 | Hayashi et al. ............. 707/102 |
| 6,038,664 A | * | 3/2000 | Schumacher et al. ....... 709/217 |
| 6,067,412 A | * | 5/2000 | Blake et al. ................. 709/101 |
| 6,108,700 A | * | 8/2000 | Maccabee et al. .......... 709/224 |
| 6,138,016 A | * | 10/2000 | Kulkarni et al. ............. 455/433 |
| 6,233,602 B1 | * | 5/2001 | Van Venrooy et al. ...... 709/203 |
| 6,240,463 B1 | * | 5/2001 | Benmohamed et al. ..... 370/238 |
| 6,263,382 B1 | * | 7/2001 | Bartlett et al. ............... 709/220 |
| 6,289,334 B1 | * | 9/2001 | Reiner et al. .................. 707/10 |
| 6,356,887 B1 | * | 3/2002 | Berenson et al. ............... 707/2 |
| 6,356,902 B1 | * | 3/2002 | Tan et al. ....................... 707/10 |
| 6,542,854 B2 | * | 4/2003 | Yang et al. .................. 702/186 |

OTHER PUBLICATIONS

Compaq Computer Corporation, "White Paper", 5 pages, Jun. 1998.
Kim Shanely, "History and Overview of the TPC", 14 pages, Feb. 1998.
"TPC–C Results—Revision 3X", downloaded from www.tpc.org, 4 pages, dated prior to Feb. 29, 2000.
"TPC–R Benchmark", downloaded from www.tpc.org, 2 pages, dated prior to Feb. 29, 2000.
"TPC–H Benchmark", downloaded from www.tpc.org, 2 pages, dated prior to Feb. 29, 2000.
Jack Stephens, "TPC–D The Industry Standard Decision Support Benchmark", 28 pages, dated prior to Feb. 29, 2000.
Select pages from www.tpc.org, 12 pages, downloaded Nov. 2, 1999.

(Continued)

*Primary Examiner*—Greta Robinson
*Assistant Examiner*—Harold E. Dodds, Jr.
(74) *Attorney, Agent, or Firm*—Mark T. Starr; Charles A. Johnson; Brian N. Tufte

(57) ABSTRACT

Methods for determining database management system server hardware requirements as a function of user-supplied transactions per second requirements, maximum processor utilization, and server type. Methods are also provided for determining workload requirements as a function of the expected transaction composition of the system including the expected transaction execution rate in transactions per second and the percent of total workload contribution by each statement. In one method, each transaction is further specified as a set of SQL statements each having a parameter list, where the workload contribution of each SQL statement is calculated as a function of the SQL statement parameter list.

15 Claims, 5 Drawing Sheets

OTHER PUBLICATIONS

User Guide, Compaq System Sizer v8.1 for Oracle8i NT4.0, Compaq Computer Corporation, Jun. 1999, pp. 1–40.

User Guide, Compaq Sizer 2.30 for Microsoft SQL Server 7.0, Compaq Computer Corporation, Oct. 1999, pp. 1–44.

"TPC–D Benchmark", downloaded from www.tpc.org, 6 pages, dated prior to Feb. 29, 2000.

* cited by examiner

SIZING SERVERS FOR DATABASE MANAGEMENT SYSTEMS VIA USER DEFINED WORKLOADS

CROSS-REFERENCE TO RELATED APPLICATIONS

The present application is related to U.S. patent application Ser. No. 09/515,308, filed Feb. 29, 2000, entitled DATABASE SIZER FOR NT SIZER SYSTEM; U.S. patent application Ser. No. 09/514,801, filed Feb. 29, 2000, entitled COMBINATION OF MASS STORAGE SIZER, COMPARATOR, OLTP USER DEFINED WORKLOAD SIZER, AND DESIGN TRADE-OFF TOOL IN ONE PACKAGE; U.S. patent application Ser. No. 09/515,158, filed Feb. 29, 2000, entitled BUILT IN HEADROOM FOR AN NT SYSTEM SIZER; U.S. patent application Ser. No. 09/516,272, filed Feb. 29, 2000, entitled ALGORITHMS TO CALCULATE MASS STORAGE REQUIREMENTS FOR NT SIZER; and U.S. patent application Ser. No. 09/514,506, filed Feb. 29, 2000, entitled METHOD OF COMPARISON FOR COMPUTER SYSTEMS AND APPARATUS THEREFOR, all of which are assigned to the assignee of the present invention and incorporated herein by reference.

FIELD OF THE INVENTION

The present invention is related generally to computers and data processing. More specifically, the present invention is related to methods for determining required sizes for servers based on user-supplied inputs.

BACKGROUND OF THE INVENTION

Relational databases came into common use in computers over twenty years ago. Despite improvements in database software and new methodologies, relational databases remain the mainstay of database management systems (DBMS). Hardware vendors originally supported proprietary database management systems which ran primarily on machines manufactured by the hardware vendor. Software developers later developed database management systems that were more open and ran on computers made by several vendors. The database management systems were also ported to run under various operating systems. This gave the advantage of spreading the cost of development over more sites and also uncoupled the dependence between hardware vendors and software vendors. Third party support and training also became more common.

Database management systems also became separated into client-side software and server-side software. This meant that the server-side software was decoupled from software having to do with the display, use, and formatting of the data received from the database. In particular, server-side software often handled mostly queries of existing data along with updates of existing data and insertion of new data.

Modem electronic commerce such as commerce over the Internet or business-to-business electronic commerce has placed increased demands on many servers. This has also made frequent upgrades necessary. Company mergers and acquisitions frequently make it necessary to incorporate large amounts of data from unexpected sources. Customer expectations also make it necessary to upgrade hardware to keep up with the faster response times users expect even though system loads may be increasing as well.

When upgrading or replacing database servers it is necessary to have a good idea as to the transaction handling requirements to be met. It is also desirable to know the DBMS transaction handling processing capabilities of any proposed system. It may be necessary to come up with a good estimate of the transaction handling capabilities of a proposed system. This may be particularly needed in a short time period, as during bid evaluations, during sales presentations, or repeatedly during scenario building.

In some situations, a required or desired transaction handling capability is based mainly on the capability of a known system. It may be the case that a given brand name DBMS server is believed to satisfy a current or future requirement, and the transaction processing capability of that DBMS server for a given benchmark is available from the vendor, A transaction rate could, in theory, be derived from a series of more specific user supplied information or requirements. It may be the case that the user has a more specific idea about what the requirements are for a system, such as detailed transaction specific information.

What would be desirable is a method to determine the required size for a database management system server based on given user supplied inputs. What would be advantageous are methods capable of determining required server size based both on required transaction processing benchmarks and on more detailed SQL processing requirements.

SUMMARY OF THE INVENTION

The present invention includes methods for determining the required size for database management system servers. In one set of methods, the transaction rate requirement is input by a user as a transactions per minute requirement, where transactions per minute is the benchmark value specifying the number of New Order transactions per minute of the TPC-C benchmark, developed by the Transaction Processing Council (TPC), a consortium of hardware and software vendors. In one method, the server type or family of servers is input along with the maximum desired processor utilization and the transactions per second requirement. In some embodiments, a baseline system transactions per second is also input, to allow for comparisons with the later calculated values.

Algorithms, according to the present invention, operate on the previously discussed inputs, and output the number of processors required, the effective CPU utilization and the number of users supported. The mass storage requirements and memory requirements can also be calculated. The transactions per second ratio of the input transactions per second to the baseline transactions per second can also be calculated along with the effective transactions per second.

Another set of methods according to the present invention allow the user to provide detailed inputs to allow the specification of a transaction rate based on more thorough knowledge of the make up of the transactions to be processed on the system. In one method, the transactions that are to make up the workload of the DBMS are named, the expected execution rate specified, and the transaction composition in terms of workload contribution is input.

The transaction composition workload can, in turn, be calculated by naming and specifying each type of SQL statement expected along with the number of records the SQL statement will operate on. In the case of SQL insert, delete, and update statements, the number of records is specified. In the case of SQL select statements, a selectivity criteria is specified. The selectivity criteria can vary depending on the type of select statement If the select is a single table select, the selectivity input is the number of rows selected from the table. For selects involving the joining of two or more tables, the selectivity criteria was geared toward most applicable cases for online transaction processing. Adding more capability for selectivity in these cases does not go outside the scope of this invention. For the invention instance implemented here, the following selectivity criteria were used. If the select is a two-table join, then the selectivity criteria is the number of rows selected for in the outer, or left table, the inner table selectivity is assumed to be an average of four for each row selected from the outer table. If the select is a three-table join, then the selectivity criteria is the number of values in the where clauses that pertain to the outer table. Joins of more than three tables were not included in this instance since these cases do not comprise the majority of transactions for this type of processing environment.

In the detailed input embodiment, the workload contribution of each SQL statement is calculated based on the SQL statement type and number of records and/or the selectivity criteria. The workload contributions of each SQL statement and the number of each type of such SQL statements can be summed to obtain a total workload contribution for the single transaction made up of these SQL statements. The workload contribution for each transaction can then be multiplied by the expected transaction execution rate for that type of transaction, and then a total workload contribution calculated for that transaction. This process can be repeated for each transaction to arrive at a total workload requirement for the transaction processing system. This total workload requirement can be expressed as a transaction throughput requirement, expressed in transactions per second, and used as input in the previously discussed method for determining the required size of the DBMS server. The calculated size of the DBMS server can thus be calculated with some precision.

DETAILED DESCRIPTION OF THE INVENTION

Figure 1:
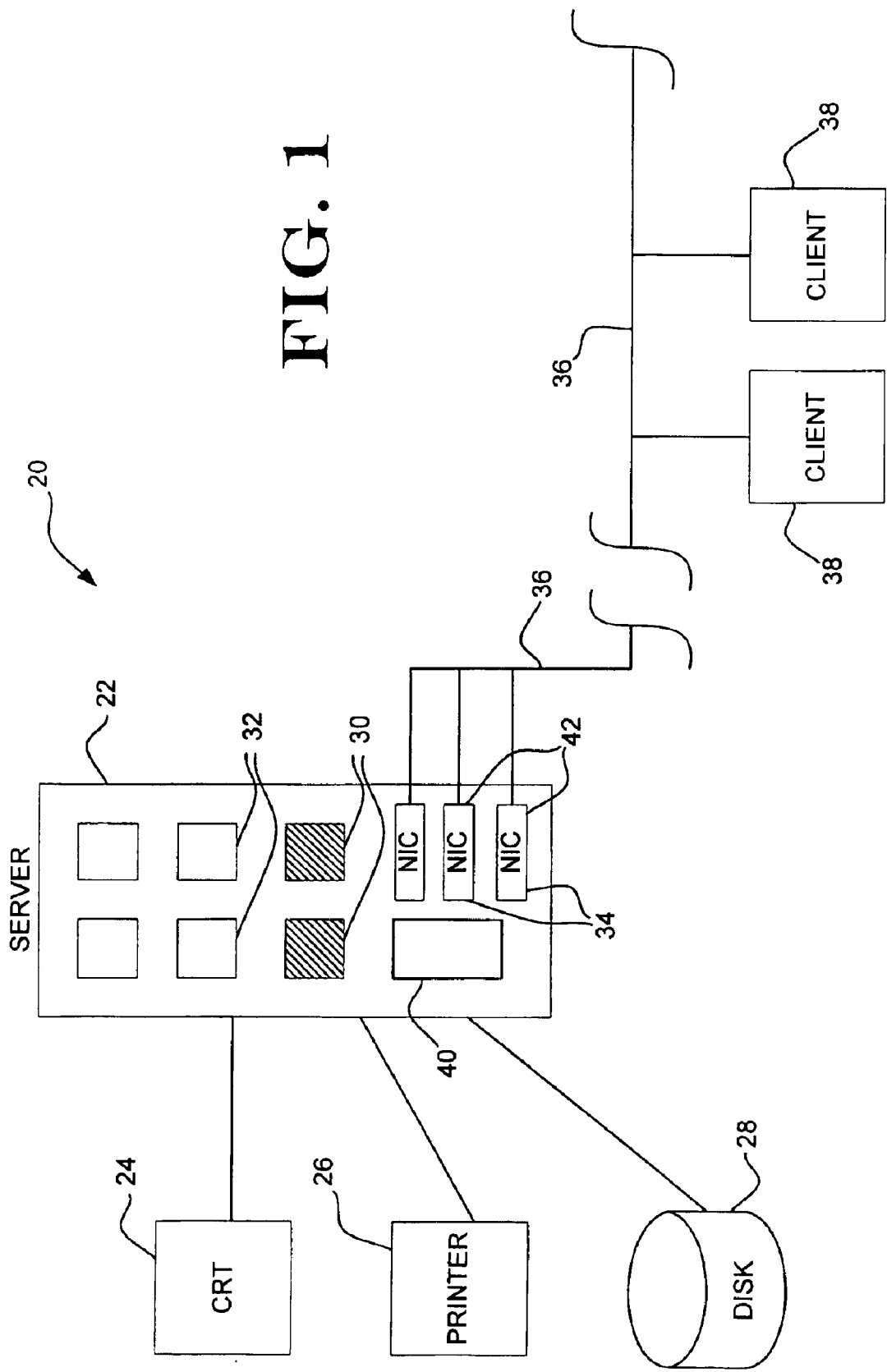
FIG. 1 is a highly diagrammatic schematic of a computer system including a database server.

FIG. 1 illustrates generally a database server system 20 including a server 22 supported by a CRT 24 and a printer 26 for programming, display, maintenance, and general Input/Output uses. Within server 22 is illustrated several CPU sockets 30 and 32, with CPU sockets 30 being populated with CPUs and CPU sockets 32 remaining empty for future expansion and population. Server 22 also includes a memory portion 40 which can contain a sufficient quantity of Random Access Memory (RAM) to meet the server's needs. A disk 28 is illustrated for mass storage, which can include disk drives or any other technology capable of holding the contents of the databases or databases to be managed. Several Network Interface Cards (NICs) 42 are illustrated as part of server 22 and are coupled to a network illustrated by a network link 36 which can be any communication link including Local Area Networks, Wide Area Networks, Ethernet, and the Internet.

Also connected to data link 36 arc client computers 38. Software clients can, in fact, reside on the same machine as the server, but in common practice, the client processes usually run on a different machine. In one embodiment, server 22 is a computer running on the Microsoft NT operating system and clients 38 are smaller computers running a Microsoft Windows operating system.

Server 22 is preferably scaleable, having extra socketed capacity for memory, processors, NICs, and disk drives. This allows extra CPUs, memory, NICs, and mass storage such as disk drives to be initially set to meet current needs and later expanded to meet changing needs.

Figure 2:
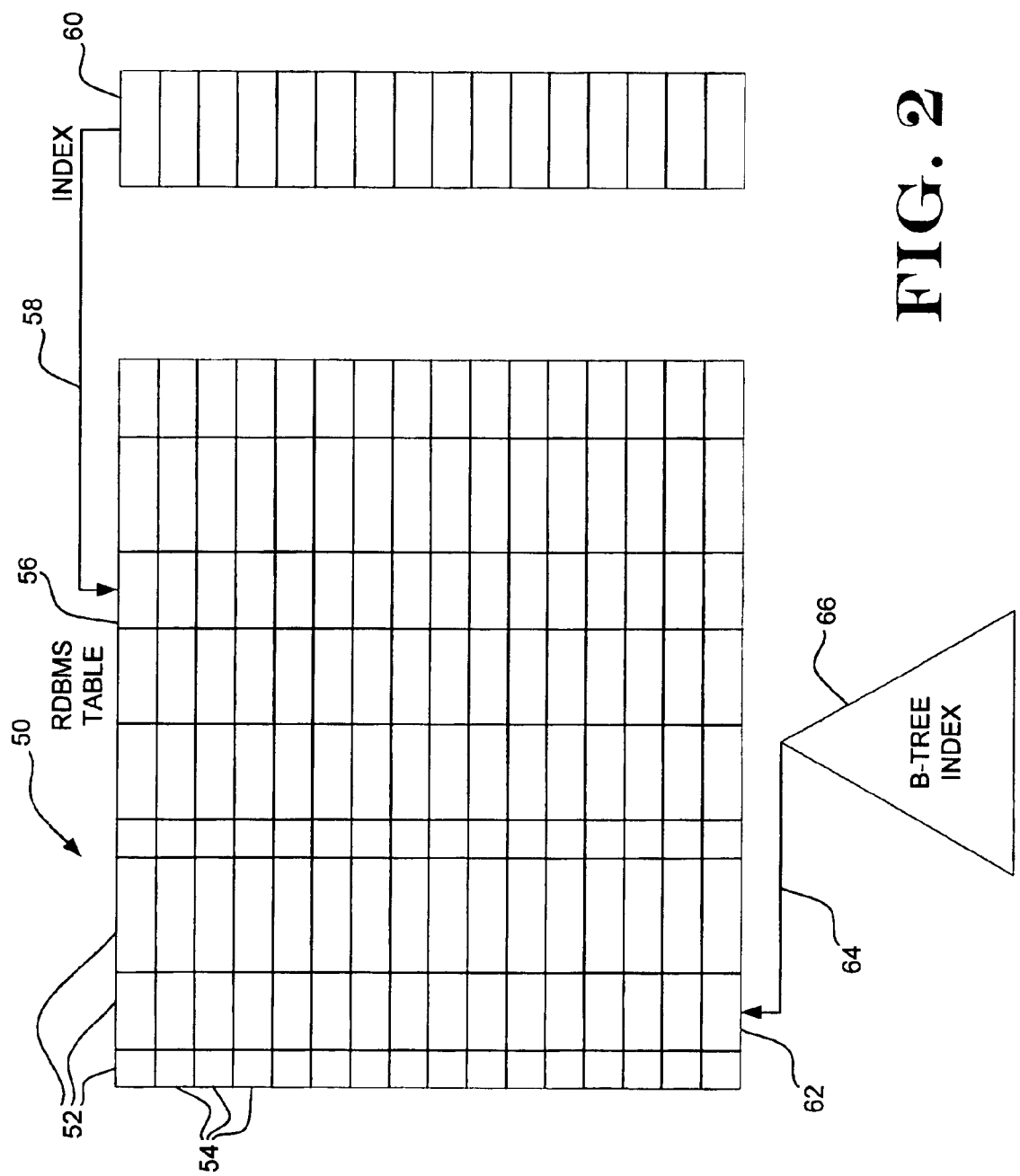
FIG. 2 is a highly diagrammatic view of a relational database.

Servers such as server 22 often exist to contain and manage data bases, such as those contained within relational database management systems (RDBMS). RDBMS include tables formed of rows or records and columns. FIG. 2 illustrates an RDBMS table 50 formed of several columns 52 and several rows or records 54. Columns 52 typically include both fixed length or width columns and variable length or width columns, where the variable length may be allocated out of a common buffer elsewhere outside of the table itself. In practice, an RDBMS system has numerous tables to be stored and managed.

It is possible for rows 54 to be ordered according to one of the columns. In practice however, the records are typically not ordered, but are linked to indices that are ordered. In a simple example, one of columns 52, such as column 56, may contain a person's social security number and be linked via a software link 58 to an ordered index 60 which contains a sorted list of social security numbers along with the record number at which the corresponding record resides. Such a sorted list of only one column of table 50 can shorten a search from order n to order log n. Such a sorted list still requires sorting upon the addition, deletion, and change of data.

A commonly used index method is illustrated for column 62, which is linked via a software link 64 to a B-tree index 66. B-tree 66 can contain a multi-level tree well known to those skilled in the software arts. B-tree 66 can be a multi-way tree such as an AVL tee or a 2–3 tree. B-tree indices have the advantage of being quick and easy to modify, without requiring massive amounts of sorting such as in a linear sorted index such as index 60. In particular, a B-tree can be maintained in a balanced condition with the addition of data to avoid skewing the shape of the tree. Maintaining the balance of the tree allows a log n search time to be maintained as well.

In practice, an RDBMS may use only a B-tree for the indexing scheme, due to its utility and flexibility. An RDBMS may maintain a B-tree on any column for which ordered searching may be later requested. As the number of columns to be indexed approaches the number of columns in the table, the data storage requirements for the indices themselves approach and pass the data storage requirements of the table itself. Thus, the data storage requirements of the indices are an important factor to be considered when determining the mass storage requirements for a table and RDBMS.

Figure 3:
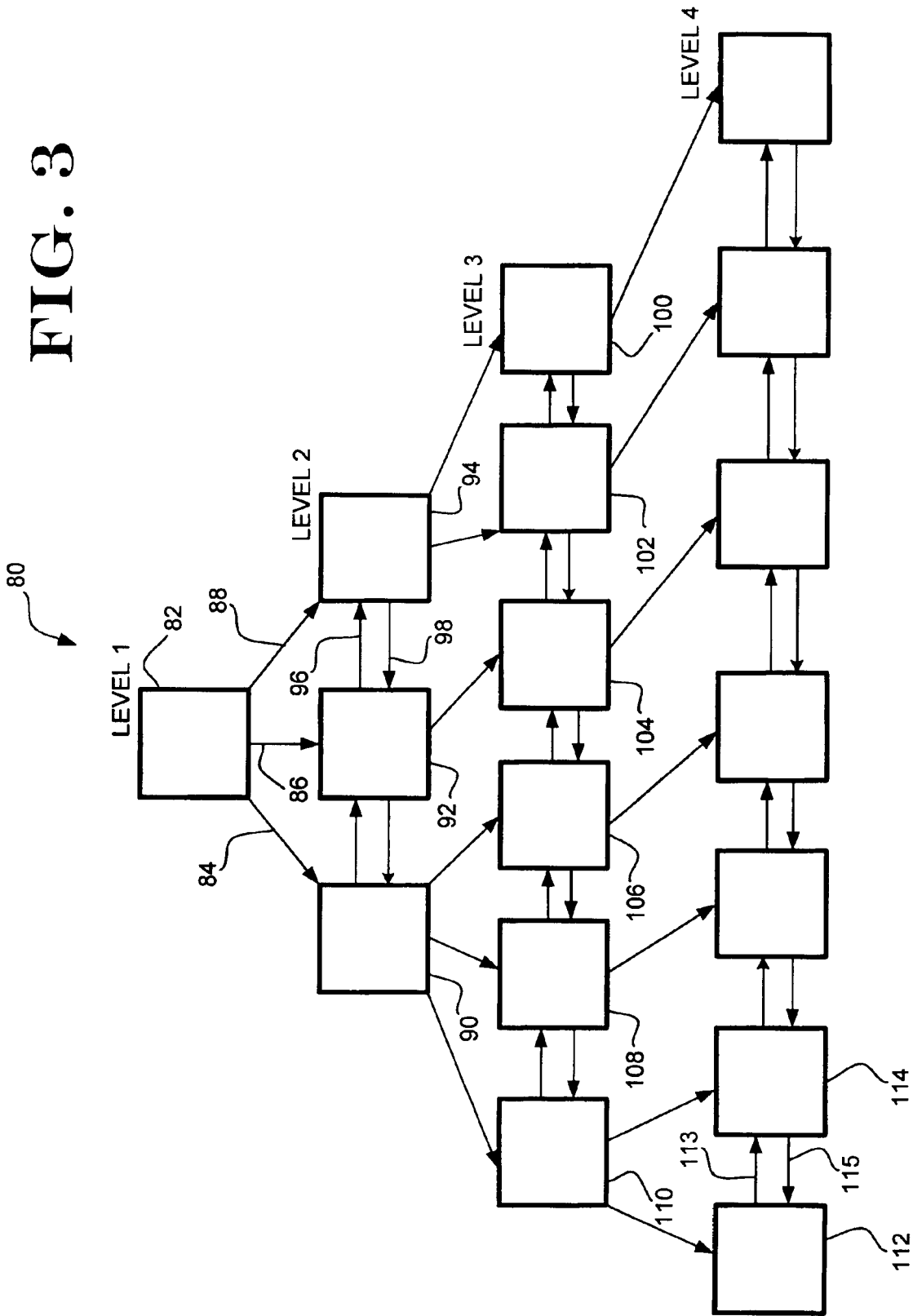
FIG. 3 is a highly diagrammatic view of a B-tree index for a relational database.

FIG. 3 illustrates a B-Tree 80 including a root node 82 at level 1 having three links 84, 86, and 88 to nodes 90, 92, and 94 respectively at level 2. The nodes at level 2 are illustrated as being doubly linked thenselves through links such as links 96 and 98. Links between nodes at the same level, such as links 96 and 98, make maintenance of the B-tree somewhat easier, and browsing can be made somewhat easier as well through use of such links. At level 3, links 100, 102, 104, 106, 108, and 110 are pointed to by the links at level 2. Level 4 is the last level in the tree. B-tree 80 has four levels, or a tree height of four. Level 4 may be said to be the "failure level" of the tree, as level 4 is the level at which a search of the tree will fail if it is to fail. If a value such as a social security number is searched for but there is no such record in the database, level 4 is the level at which the search will fail. At level 4, nodes 112 and 114 are linked together as a doubly linked list by links 113 and 115. In practice, the failure level of a B-Tree is often linked together in this or a similar manner.

In a B-tree, the nodes in the B-tree typically contain only the key or column values the tree is ordered for and points to nodes in the next level related to those keys or column values. For example, in a two-way tree, a node would have one index value, and two pointers, indicating which nodes to go to for values greater than or less than the index value, respectively. B-Trees and databases vary in what they have at the failure level. In some databases, herein termed "physical ordered databases", the failure level has the records themselves linked together. In these databases, once the failure level is reached, the record has been obtained, with no further I/O necessary to obtain the record. In other databases, herein termed "non-physical ordered databases", the nodes at the failure level contain only pointers or record numbers into the main table. In these databases, another I/O is required to obtain the record of interest. In some databases, the failure level contains neither the record of interest nor a pointer to the record of interest. Instead, a unique key is contained, requiring a search on that key to obtain the record of interest For example, a search of B-Tree ordered on last name plus first name may return only a social security number upon successful completion. Another B-tree or highly optimized index based on social security number can then be rapidly searched for the record of interest In this scheme, at least one more I/O is required after the failure level has been reached. The number I/Os required to reach a record is of interest to because it determines in part the speed of the database. Both disk I/O and network I/O require latent time to process.

In sizing a database, the RDBMS typically has a page size, or an aggregate unit of mass storage typically numbering thousands of bytes. The page size on some computers may be determined in part by operating system and disk system factors. The page size may also be determined by a desire to keep the width of internal variables within the database to manageable limits. The page size is fixed in some RDBMSs and selectable in other RDBMSs.

The amount of mass storage required for a single table is a function of several variables, such as the number of rows or records and the number of columns. The database storage required is not a simple calculation of the row size and column sizes for several reasons. First, the column sizes or widths may be variable. Second, the page size enters into the calculation in a non-continuous manner, as some database allocation such as record allocation must lie within a single page rather than cross page boundaries, with some space wasted as a result. Third, some space in a page is set aside for future expansion or reserved for use a buffer space, as when reordering data. Fourth, not all space within a page is available for end user data storage, with some being used by the RDBMS itself or for other overhead. In particular, in some RDBMSs, a fraction of each page is specified as not available for initial storage. In some RDBMSs, a number of rows are set aside as non-usable. In some RDBMSs, a fraction of each record is set aside as non-usable. As previously mentioned, the size of the indices may be a large portion of table storage even though the data itself may not be stored within the indices. All of the aforementioned factors makes sizing the required databases a complicated matter, as is dealt with below.

Figure 4:
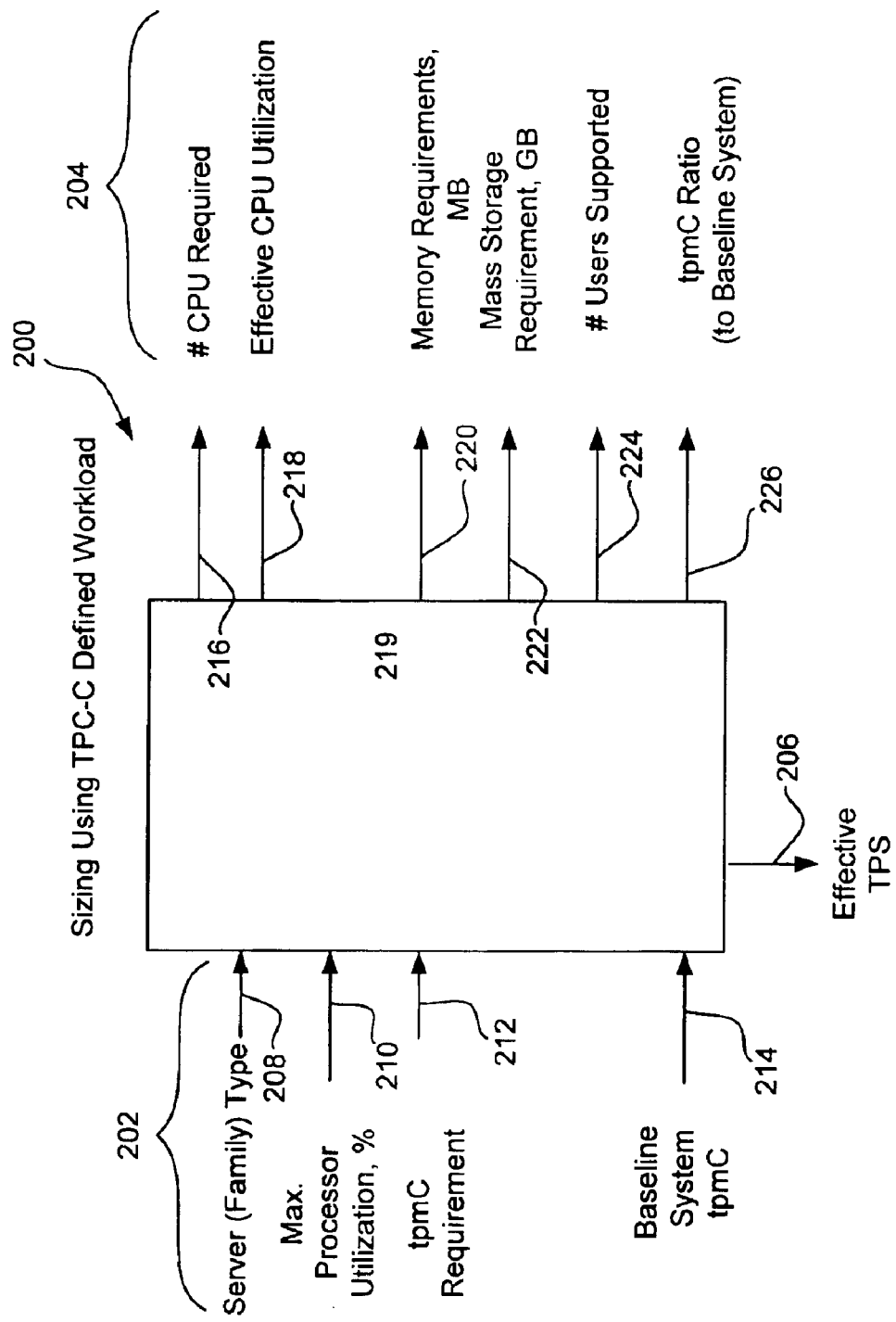
FIG. 4 is a modified dataflow diagram of the method used to calculate DBMS server hardware requirements based on a workload requirement specified explicitly via user entered transactions per second.

FIG. 4 illustrates a method 200 for determining the required size of a DBMS server using a transaction throughput benchmark as one of the inputs. In the embodiment illustrated, the TPC-C benchmark is used as the transaction processing environment. The tpmC input refers to the number of New Order Transactions Per Minute for the TPC-C benchmark In TPC-C, throughput is defined as how many new order transactions per minute a system generates while the system is executing four other transactions types, payment, order-status, delivery, and stock-level, in this benchmark the New Order transaction comprise approximately 40% of the workload.

Method 200 includes inputs 202, outputs 204, and the effective transactions per second (TPS) 206. TPS 206 is the total number of transactions executed per second and is calculated using the equation:

$$TPS = tpmC/36$$

Inputs 202 include the server type 208, the maximum desired processor utilization in percent 210, and the tpmC requirement 212. Optionally, the method may include the tpmC handling ability of a baseline system, indicated at 214, for purposes of comparison. Server type 208 may also be referred to a server family as the server type may include a configurable system, an expandable system, or a family of different hardware systems having varying hardware characteristics. In one embodiment, server type 208 may include varying numbers of processors (CPUs), memory, and mass storage.

The TPC-C benchmark is an Online Transaction Processing (OLTP) benchmark. Key characteristics are a high frequency of transactions executed, a large proportion of the transactions are inserts and updates, and transaction response times should be one second or less. Thus, these characteristics require indexed database access to minimize response time. Further, the database is expected to grow in proportion to the transaction rate.

A series of measurements were conducted with different numbers of processor configurations and processor speeds. Database sizes were proportionately increased with expected increase in transaction throughput All benchmark tests were run to 100% processor utilization for the given configuration. The achieved throughput (tpmC), memory used, number of processors, processor speed, mass storage used, number of user simulated were recorded for each benchmark test.

Using the results of these tests a matrix of the above performance and configuration values for each configuration is built. Where configurations are missing interpolation techniques are used to supply the missing values.

For example the following set of published measurement results were used:

| System | Mhz | nCPU | tpmC | Mass Storage | No. Users | Memory |
|---|---|---|---|---|---|---|
| Unisys/Aquanta ES2025 Server | 550 | 2 | 10266 | 705 | 8160 | 1024 |
| Unisys/Aquanta ES2043 Server | 500 | 4 | 23190 | 1593 | 18600 | 4096 |
| Unisys/Aquanta ES2043R Server | 500 | 4 | 23190 | 1593 | 18600 | 4096 |
| Unisys/Aquanta ES2045 Server | 500 | 4 | 23852 | 1636 | 19050 | 4096 |
| Unisys/Aquanta ES5045 | 500 | 4 | 24329 | 1815 | 19480 | 4096 |
| Unisys/Aquanta ES2085R Server | 550 | 8 | 37757 | 3079 | 30480 | 4096 |
| Unisys/Aquanta ES5085R Server | 550 | 8 | 40670 | 3562 | 32550 | 4096 |

This data was then averaged for each configuration and scaled to the lowest Mhz rating. This yielded the following table:

| Mhz | nCPU | tpmC | Mass Storage | No. Users | Memory |
|---|---|---|---|---|---|
| 500 | 2 | 9333 | 641 | 7418 | 1024 |
| 500 | 4 | 23640 | 1659 | 18933 | 4096 |
| 500 | 8 | 35649 | 3019 | 28650 | 4096 |

Using curve fitting, this data was then expanded to include estimates at 100 percent processor busy from one to the maximum possible processors. For 500 Mhz processors, die results were as follows:

| nCPU | tpmC | Mass Storage | No. Users | Memory |
|---|---|---|---|---|
| 1 | 6,189 | 352 | 4,902 | 512 |
| 2 | 9,333 | 641 | 7,418 | 1,024 |
| 3 | 16,486 | 1,150 | 13,175 | 1,024 |
| 4 | 23,640 | 1,659 | 18,933 | 4,096 |
| 5 | 26,642 | 1,999 | 21,362 | 4,096 |
| 6 | 29,644 | 2,339 | 23,791 | 4,096 |
| 7 | 32,647 | 2,679 | 26,221 | 4,096 |
| 8 | 35,649 | 3,019 | 28,650 | 4,096 |

Using techniques, similar results can be calculated for the 550 Mhz processors.

In the method 200 the smallest configuration satisfying both the tpmC 212 requirement and the MaxProcessorUtilization% 210 is selected. The configuration selected then yields the outputs #CPURequired 216 and MemoryRequirements,MB 220. The effectiveCPUUtilization 218 is calculated as EffectiveCPUUtilization 218=(tpmCRequirement 212)/(tpmC at 100% for the configuration). The outputs MassStorageRequirement 220 and #UsersSupported 224 are obtained by interpolating between values for the configurations in the same portion as tpmC required. For example, if 2 CPUs are required, then the #UserSuported 224 is calculated as

UsersSupported=(#UserrSupported with 1 CPU)+(EffectiveCPUUtilization 218)*((#UsersSupported with 2 CPUs)-(#UsersSupported with 1 CPU))

A calculation is made for MassStorageRequirement 222.

The mass storage required 222 can also be determined by method 200. The mass store required can be satisfied by adding the appropriate size and number of mass storage devices such as disk drives. The required mass storage can be calculated using the methods described in related applications U.S. patent application Ser. No. 09/516,272, filed Feb. 29, 2000, entitled ALGORITHMS TO CALCULATE MASS STORAGE REQUIREMENTS FOR NT SIZER, and U.S. patent application Ser. No. 09/515,308, filed Feb. 29, 2000, entitled DATABASE SIZER FOR NT SIZER SYSTEM, herein incorporated by reference. The tpmC ratio 226 provides a means for comparing the system specified by the inputs to method 200 and a baseline system tpmC 214 provided by the user. In one embodiment, a top window in the application program can be used to selectively browse through the tpmC database. The browsing can be filtered based on the operating system and database management system. In one embodiment, the tpmC database is filtered according to operating system and DBMS to provide a shorter list, which is selectable via a drop down list to a single tpmC database record, which can be termed the "baseline" system. The tpmC value from the record can be used as the value for the baseline system. In some embodiments, a known system from one vendor is selected as the baseline system on one part of the screen. The requirements can be used to select for another system, termed the 'target' system, from a second vendor in another part of the screen. The tpmC of the target system can be compared to the tpmC of the baseline system using ratio 226.

Figure 5:
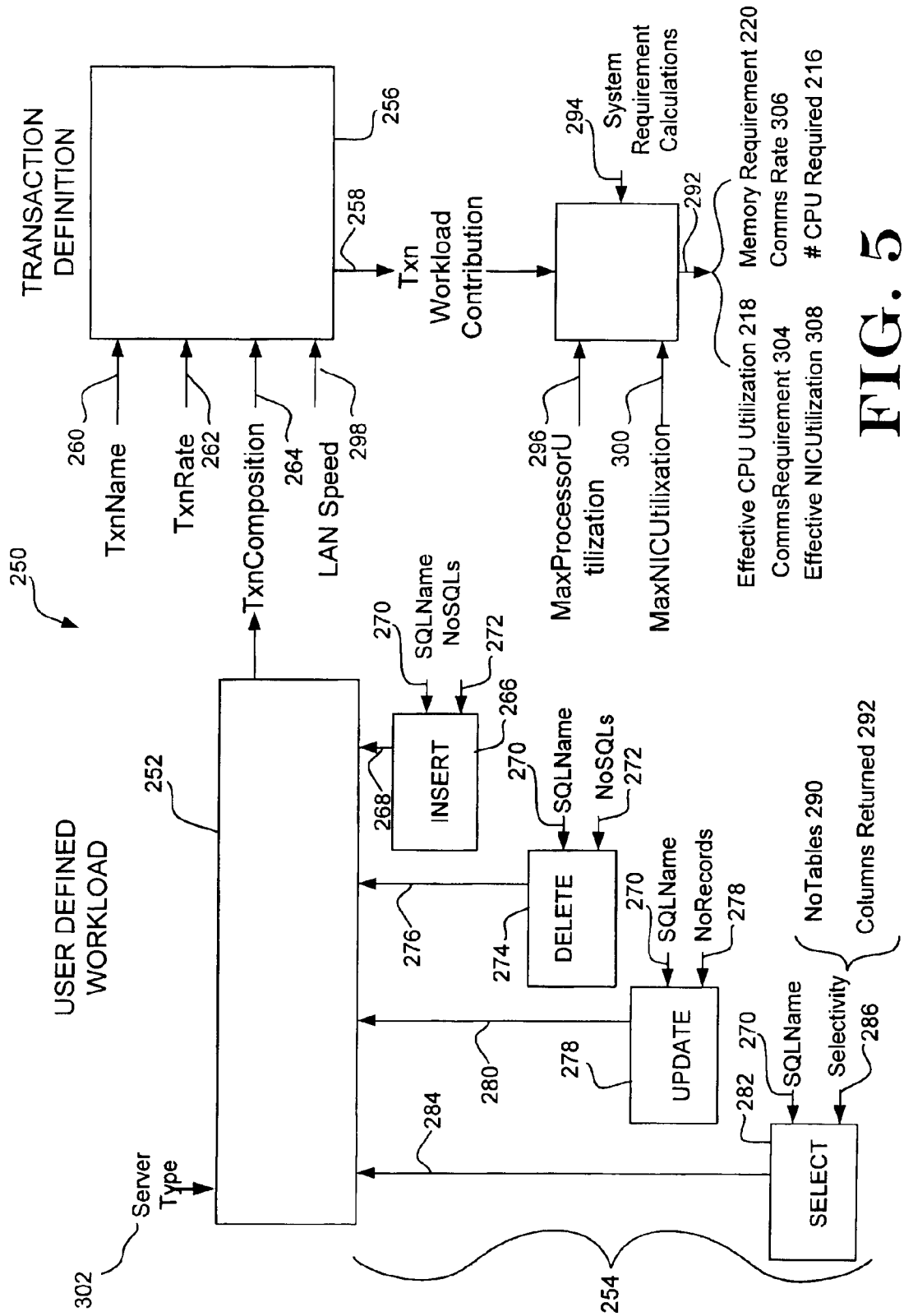
FIG. 5 is a modified dataflow diagram of the method used to calculate a DBMS server hardware requirements based on a user defined workload specifying transactions, rate, and composition of user defined transactions and rates including SQL statements and types including the number of records operated on and selectivity criteria.

Referring now to FIG. 5, in another embodiment of the invention, more detailed inputs are provided to the program to allow direct calculation of the estimated system configuration requirements. In FIG. 5, a method 250 is used to calculate a workload contribution 258 for each user defined translation. WorkloadContribution 258 can be quantified in units of total CPU utilization and NIC utilization A user defined transaction can include a transaction name, indicated at TxnName 260, an expected execution rate of the transaction, indicated at TxnRate 262, a LANSpeed, indicated at LANSpeed 298, and a transaction composition, indicated at TxnComposition 264. TxnName 260 can be a user-defined name given to each of the user-defined transactions. TxnRate 262 is the expected execution rate of the user-defined transaction, typically in transactions per second. TxnComposition 264 includes the user specified SQL composition of the transaction, discussed further below.

TxnComposition 264 can be determined by a method 252, and includes the SQL statement compositions 254, including the numbers of those SQL statements, and some parameters included for each SQL statement. SQL statements contributions include insert contributions 268, delete contributions 276, update contributions 278, and select contributions 284, each of which can include the seconds of total CPU time required to execute the SQL and the NIC usage in the total number of bytes passed both ways on the LAN. Method 252 can sum together the workload contributions of each of the SQL statements into total TxnComposition 264. An additional input to method 252 is server type 302 which provides the relative speed with which the SQL will be executed.

One method, indicated at 266, calculates the workload contribution of each SQL insert statement, which can be user defined to include a name, indicated at SQLName 270, and the number of identical SQL insert statements, indicated at NoSQLs 272. In general, the larger the number of SQLs, the larger the workload contribution will be. SQL insert method 266 is typically generates outputs 268 in units of seconds of CPU usage and number of bytes transferred on the LAN. For one CPU usage, a constant number of seconds are required to insert a single record. For LAN usage, the number of bytes transferred is typically a function of the size of the record to be inserted and the average column per row size. For further discussion, see the experimental results section.

SQL delete method 274 calculates the workload contribution of each SQL delete statement, which can be user defined to include a name, indicated at SQLName 270, and the number of identical SQL delete statements, indicated at NoSQLs 272.

SQL delete method 274 is given below and typically generates output 276 in units of seconds of CPU usage and number of bytes transferred on the LAN. For CPU usage, the CPU time required to delete a record is a constant. For LAN usage, the number of bytes transferred is also typically a constant. For further discussion, see the experimental results section.

SQL update method 278 calculates the workload contribution of each SQL update statement, which can be user defined to include a name, indicated at SQLName 270, and the number of records updated for this SQL statement, indicated at NoRecords 288.

SQL update method 278 typically generates output 280 in units of seconds of CPU usage and number of bytes transferred on the LAN. The CPU usage is typically a function of the number of records updated. For LAN usage, the number of bytes transferred is typically a function of the number of records updated. For further discussion, see the experimental results section.

SQL select method 282 calculates the workload contribution of each SQL select statement, which can be user defined to include a name, indicated at SQLName 270, with three other input parameters as the number of tables joined in the select, indicated at NoTables 290; the selectivity, indicated at Selectivity 286; and the number of columns returned, indicated at ColumnsReturned 292.

Select method 282 includes a selectivity criteria input 286, which can vary depending on the type of SQL select statement specified. In a preferred embodiment, the assumption is made that the select statements are indexed which is consistent with OLTP applications. In this same embodiment, for selects involving the joining of two or more tables, the selectivity criteria was geared toward most applicable cases for OLTP processing. Joins of more than three tables were not included since these cases do not comprise the majority of the transaction activity. Instead, the embodiment concentrated on providing most often occurring cases. To this end, the selectivity was defined for the cited embodiment as follows. If the select is a single table select, selectivity input 286 is the number of rows returned from the table. If the select is a two-table join, then selectivity criteria 286 is the number of rows selected from the outer, or left table, the inner table selectivity is assumed to be an average of four for each row selected from the outer table. If the select is a three-table join, then selectivity 286 is the number of values in the WHERE clauses that pertain to the outer table.

SQL select method 282 typically generates output 284 in units of seconds of CPU usage and number of bytes transferred on the LAN. The CPU usage is typically a complex function of the selectivity, including the table dimensions. For further discussion, see the experimental results section.

For each of the named SQL statements, a series of workload contributions 284, 280, 276, and 268 are generated and summed by method 252 and output as the total TxnComposition 264 which can have units of seconds of CPU usage. TxnComposition 264 can be multiplied by the transaction rate TxnRate 262 to arrive at the transaction workload contribution, TxnWorkloadContribution 258. Each transaction can be named and specified in terms of the SQL statements, and the number of records and/or the selectivity criteria supplied. The total of all TxnWorkLoadContributions 258 can be summed together to arrive at a first estimate of total CPU utilization and total NIC utilization.

The value of the system configuration requirement can be obtained from the method SystemRequirementCalculations 294. The method 294 uses as input the two TxnWorkloadContribution components 258 and the input parameters MaxProcessorUtilization 296 and MaxNicUtilization 300. The method 294 produces the system configuration requirements 292. The system configuration requirements 292 consists of the outputs #CPURequired 216, EffectiveCPUUtilization 218, MemoryRequirements 220, the LAN speed, indicated at CommsRequirement 304, the effective communications transfer rate, indicated at CommsRate 306, and the effective utilization of the NIC, indicated at EffectiveNICUtilization 308.

EXPERIMENTAL RESULTS AND DETAILED METHODS

Measurement Definition and Methodology

A series of 14 SQL statements were defined for measurement on NT Servers running the database products SQL Server 6.5 and Oracle 8.04. These SQL statements, which were run against the tables defined for the 1 GB version of the TPC-D database, were thought to encompass several possible scenarios and business cases for the OLTP environment.

The series of SQL statements, consist of the following types:

Inserts
Deletes
Updates
Single table select: three selectivities
Two table join: three selectivities
Tree table join: three selectivities The intent behind this set of measurements was that any OLTP transaction can be thought of as some combination of the above SQLs or extensions of them. Thus, the sizer will solicit the user for the series of generic SQLs comprising each transaction. Based on curve fit estimates obtained from the measurement results, one can then estimate the CPU usage for each SQL and subsequently each transaction. By applying workload metrics to each transaction, one can then calculate the CPU utilization and subsequently, the CPU requirement.

The measurement of each SQL was run individually from a client, with no other load on the system. Each test consisted of one or more executions of the same SQL. A SQL may have been run several times in order to obtain a sufficient sample size in the collection of resource usage data. Further, each execution of a given SQL was written to cause the RDBMS to re-parse the SQL before executing it.

Scripts were developed to execute the series of SQLs and to cause certain RDBMS data to be collected and recorded. In order to implement re-parsing for each SQL execution, the script was written accordingly for each RDBMS. Specifically, SQL Server allowed looping and also parsed for each instance within the loop whereas Oracle appeared to parse only once within a loop; consequently, the Oracle SQLs could not be looped, and the scripts were written accordingly.

During each test, performance data was collected from the NT Performance Monitor on the server as well as from the RDBMS data collection construct (SQL Server's ISQL DBCC commands and Oracle's utlbstats/utlestats). This was after the NT Server, the NT Performance Monitor, and the RDBMS were conditioned prior to each test.

Measurement Results

Although several metrics were collected from each measurement, the metrics of most relevance to this version of the sizer were those that measured the CPU resource usage. This consisted of the following:

Elapsed time

Total per cent processor busy

Per cent processor busy due to the RDBMS

Other statistics, such as logical reads and writes, and physical reads and writes, were also collected. However, this data was not used in the current version of the sizer, this was because all of the table accesses were indexed, and the number of logical IOs was always the number of B Tree levels plus data, consistent with an OLTP environment.

The processor data used in the sizer is the total processor usage, consisting of the RDBMS portion plus the kernel where the kernel activity is assumed to be attributed to the IO activity. In the current version of the sizer the CPU usage due to IO activity is not calculated separately.

Applicant believes that the total CPU time should be approximately the same for a given RDBMS, independent of the number of processors configured. The rationale is that the same amount of work is being done but that the work may be parsed out to a multiple number of processors; the exception is that there is some overhead to parse the work out so that possibly the total CPU time might increase slightly as a function of the number of processors configured. Results from most of the Oracle measurements support this conjecture. It is expected that the same is true for SQL Server Analysis and Curve Fitting Insert For inserts, a single record was inserted into a table 10 times followed by a commit This sequence was repeated 582 times. The CPU time (on a 200 MHz processor system) attributed to inserts, and used in the sizer, was then calculated as Seconds per record inserted=(Total CPU Time)/582/10

Values used in the sizer are:

SQL Server 0.004761

Oracle 0.009

Delete

The deletes were measured during the process of reverting the database to its original state following the inserts. For the table used, an average of 3.88 records were deleted per delete SQL. In this case, 10 deletes were followed by a commit, and this process was repeated 150 times to return the table to its original condition. The CPU time attributed to deletes, and used in the sizer, was calculated as Seconds per delete SQL with 3.88 records deleted per SQL=(Total CPU time)/150/10

Values used in the sizer are:

SQL Server 0.015416

Oracle 0.015

Update

Three sets of measurements were conducted for update SQLs:

A single SQL updated one record; this was followed by a commit

A single SQL updated five records; this was followed by a commit

Each set of measurements was repeated 100 times.

SQL Server: For the sizer, the CPU time attributed to SQL Server updates was calculated based on the first two points, specifically:

CPU Time=0.0012491*(No. records updated per SQL)+ 0.0004697 seconds

Oracle: The results show fair amount of reduction in overall CPU time for updates as a function of the number of CPUs. The curve fitting for CPU time attributed to Oracle updates was calculated based on both the number of CPUs and the number of records updated per SQL, specifically:

CPU Time=−0.00248697*(No. CPUs)+0.00033591*(No. records updated per SQL)+0.00995405 seconds Currently the sizer pessimistically uses calculations based on 1 CPU.

Single Table Select—Indexed

Three single table SELECT SQLs were individually run. The WHERE clauses were set to produce selectivities of 2,588, 12,477, 24,896 records, respectively. These SQLs were defined so that the access method of the RDBMS was indexed, consistent with an OLTP environment. For SQL Server this was via a cluster key, thus, eliminating the additional IO to another leaf page if instead the index were non-clustered. For Oracle, this was via a standard index. The most suitable curve fit for both RDBMS seemed to be to divide the CPU time by the number of records selected, and then averaging that value. A value of 0.1 msec was given each RDBMS for parsing the SQL The resulting formulas used, and applied in the sizer, were the following:

SQL Server: (CPU Time)=0.00006.73E*(Records Selected)+ 0.0001

Oracle: (CPU Time)=0.00218*(Records Selected)+0.0001

Note that the usual methods of curve fitting would apply to the selectivities noted, i.e., a very large number of records selected. Extrapolating to a few records selectivity (consistent with OLTP) produced either extremely large or extremely small CPU time overheads. As a result, the method of averaging time per record selected was chosen as a means of estimation.

Two Table Join—Indexed

For the two table join, an example of the business basis for the SQL SELECT was to find the various sources (e.g., prices) of a given item or list of items. In this case, there were on the average four such sources for each item. Three SQL SELECTs were constructed to return the sources for one, five, and 10 items, respectively. Results of the measurements for each RDBMS are shown in the charts below.

SQL Server: Curve fitting based on the template y=a*x^b produced the following results:

(CPU Time)=0.0014665*(Items Selected)^0.7552

Oracle: Curve fitting based on the template y=a*x+b produced the following results:

(CPU Time)=0.00858*(Items Selected)+0.003236

Three Table Join—Indexed

For the three table join, an example of the business basis for the SQL SELECT was to determine the status of orders placed on certain dates from a selected segment of the customer population. For this particular database, the customer segment chosen places about 20% of all of the orders. Each order consists of approximately 4 items on the average. For this set of measurements three SQLs were defined to return status on one, five, and 10 order dates.

Curve fitting for both the SQL Server and Oracle RDBMS' was based on the template y=a*x+b. For the Oracle case, the measurement results were first averaged over the number of CPUs for each point; then linear curve fitting was applied to the averages.

The resulting formulas used, and applied in the sizer, are the following:

SQL Server: (CPU Time)=0.001306*(Selectivity on Outer Table)−0.00039

Oracle: (CPU Time)=0.002521*(Selectivity on Outer Table)+0.001

LAN USAGE

This section provides the formulas used to calculate the LAN bytes passed per SQL statement.

Using the Ethernet and TCP/IP protocol, a certain amount of bytes are passed with each message. Some of these values are as follows:

FrameHeader=72 bytes

When a SQL arrives or when it is either simply acknowledged or data is passed back, the following assumptions are made as to the amount of data transferred across the LAN:

SQLInsertIncomingData=200 bytes
SQLUpdateIncomingData=200 bytes
SQLDeleteIncomingData=200 bytes
SQLSelectIncomingData=200 bytes
SQLAckonowledge=100 bytes The amount of data CommBytes transferred both ways across the LAN is estimated as follows per SQL:

Inserts:
CommBytes=2*FrameHeader+SQLInsertIncomingData+AverageColumnsPerRow+SQLAcknowledge Deletes:
CommBytes=2*FrameHeader+SQLDeleteIncomingData+SQLAcknowledge Updates:
CommBytes=2*FrameHeader+SQLUpdateIncomingData*NoRecords+SQLAcknowledge Selects:
1 Table: Selected Bytes=Selectivity*BytesPerColumn*NoColumns
2 Tables: Selected Bytes=4*Selectivity*BytesPerColumn*NoColumns
3 Tables: Selected Bytes=5*Selectivity*BytesPerColumn*NoColumns CommBytes=FrameHeader+SQLSelectIncomingData Do While SelectedBytes>1500' too big for a frame, break up into 1500 bytes
  CommBytes=CommBytes+TCPIPHdr+1500
  SelectedBytes=SelectedBytes−1500
  Loop
  If SelectedBytes>0 Then
  CommBytes=CommBytes+TCPIPHdr+SelectedBytes
  End If
nd

HEADROOM CALCULATIONS

This SECTION describes a method for calculating the system configuration requirement and the headroom.

Processor Requirement

Define

TxnRate_I=transaction rate of transaction I
CPUTime_I=total CPUTime used to execute one instance of transaction I
TxnRate_T=sum of TxnRate_I over all transactions For each transaction, an input to method 294 is the transaction's effective contribution to CPU utilization, expressed as (CPUTime_I)*(TxnRate_I)

Define

Util_1CPU sum of (CPUTime_I)*(TxnRate_I) over all transactions

So Util_1CPU is defined as the effective utilization of a single CPU, Note that this value can exceed 100%, implying that more than one CPU is required to service the transaction rate.

One method to determine the CPU requirement NoCPUs is as follows:

NoCPUs=CEILING(Util_1CPU/100)
While (Util_1CPU/100)/NoCPUs>MaxProcessorUtilization
NoCPUs=NoCPUs+1
Wend We note, however, that adding multiple processors does not increase performance with 100% efficiency. Thus, for example, by doubling the number of processors, we achieve anywhere from 150% to 180% as much performance, rather than 200%. Much of this is due to a combination of the instruction speed slows due to locality of reference and the number of instructions per transaction increase due to increased housekeeping overhead.

The service time per transaction is the quotient (instructions per transaction)/(instructions per second). It has been found in studies that the service time per transaction is a linear function of the number of processors, i.e., service time per transaction, n processors=(service time, 1 processor)*(a*n+b) where a and b are constants determined from analysis of measurement results. Thus, the transaction rate is proportional to the reciprocal, that is, transaction rate~1/(a*n+b)

For this version of the sizer, the values a, b are:
a=0.028982
b=0.973703

The above algorithm is then modified as follows:

Define
NoCPUs=CEILING(Util_1CPU/100)
CPUSvc_1x=Util_1CPU/Txn_Rate_T
bResult=False
While Not bResult
temp=NoCPUs/(a*NoCPUs+b)*MaxCPUUtilization
If temp<Util_1CPU Then
  NoCPUs=NoCPUs+1
Else
bResult=True
EffectiveCPUUtilization=Ceiling((a*NoCPUs+b)*Util_1CPU/NoCPU*100)
End If
Wend Using this method, if the selected processor type does not meet the transaction method, then the next faster processor is selected, and the above process is repeated.

The headroom algorithm ensures the following:

The EffectiveCPUUtilization in the above calculations does not exceed the MaxCPUUtilization, thus allowing the user to select a MaxCPUUtilization which is lower than required for good performance, thus allowing "headroom" for growth.

If the MaxCPUUtilization criteria is not achievable, then the next faster CPU is selected.

LAN Speed Requirement

The LAN speed requirement is determined in a manner similar to that described above.

Define
NIC_Speed(i)=bandwidth of NIC card i, expressed in megabits per second; values are 10, 100,1000
NICType=bandwidth of NIC card selected
CommReq=bytes per second required for all of the transactions
MaxNICUtil(i)=Recommended maximum utilization of NIC card i
NICType=0
For i=1 To Number of Card Types, starting with lowest capacity
   Temp=NIC_Speed(i)*MaxNICUtil(i)/8/1000000
   If CommReq<=Temp Then
      NICType=NIC_Speed(i)
      Exit For
   End If
Next
If NICType=0
   Message: "The communications requirement exceeds the effective maximum imposed by the utilization limit for all LAN speeds."
End If This algorithm also demonstrates the headroom algorithm.

Memory Calculations

Because the database servers are of the enterprise quality, the amount of memory required is generally very high. As a rule of thumb the memory requirement has been specified as an additional 512 MB per processor up to the limit imposed by the machine and the operating system.

Numerous advantages of the invention covered by this document have been set forth in the foregoing description. It will be understood, however, that this disclosure is, in many respects, only illustrative. Changes may be made in details, particularly in matters of shape, size, and arrangement of parts without exceeding the scope of the invention. The invention's scope is, of course, defined in the language in which the appended claims are expressed.

What is claimed is:

1. A computerized method for determining computer hardware requirements for a yet-to-be built database management system saver using user defined workload requirements, the method comprising the steps of:
   obtaining at least one user defined workload requirement;
   determining the database management system server hardware requirements for the yet-to-be built database management system server as a function of said user defined workload requirement; and
   outputting said yet-to-be built database management system server requirements,
   wherein said user defined workload requirement includes a baseline system transactions per second, and said output includes a calculated transactions per second value, and a ratio of said calculated transactions per second to said baseline transactions per second, and wherein said determining step determines values for said calculated transactions per second and said transactions per second ratio.

2. A computerized method for determining computer hardware requirements for a yet-to-be-built database management system server using a user-defined workload, the method comprising the steps of:
   obtaining from a user a plurality of transaction definitions, wherein each of said transaction definitions have a transaction workload contribution and an expected execution rate per second;
   calculating a total expected workload as a function of said transaction definitions; and
   outputting said total workload to said human user.

3. A computerized method for determining computer hardware requirements for a yet-to-be-built database management system server using a user-defined workload, the method comprising the steps of:
   obtaining from a user a plurality of on definitions, wherein each of said transaction definitions have a transaction workload contribution and an expected execution rate per second;
   determining a total expected workload as a function of said transaction definitions; and
   determining the database management system server hardware requirements for the yet-to-be built database management system server as a function of said total expected workload.

4. A computerized method according to claim 3, further comprising the step of obtaining a server type from said user.

5. A computerized method according to claim 3, further comprising the step of obtaining a maximum desired processor utilization.

6. A computerized method according to claim 3, further comprising the step of obtaining a maximum desired network interface card utilization.

7. A computerized method according to claim 3, further comprising the step of obtaining a server type, a LAN speed, a maximum desired processor utilization, and a maximum desired network interface card utilization.

8. A computerized method according to claim 3, wherein at least some of said transaction definitions include at least one SQL statement wherein each of said transaction workload is calculated by calculating a workload contribution of each of said SQL statements.

9. A computerized method according to claim 8, wherein said SQL statements include insert, delete, update, and/or select SQL statement types.

10. A computerized method according to claim 9, wherein
    said insert SQL types have parameters including a number of identical insert statements, and wherein said insert statement SQL workload contribution is a function of said statements parameters,
    said delete SQL types have parameters including a number identical delete statements, and wherein said delete statement SQL workload contribution is a function of said statement parameters,
    said update SQL types have parameters including a number of records to be operated on by said update statement and wherein said update statement SQL workload contribution is a function of said statement parameters, and
    said select SQL types have parameters including selectivity criteria, and wherein said select statement SQL workload contribution is a function of said statement parameters.

11. A computerized method according to claim 3 wherein the database management system server hardware requirements includes a processor type for the yet-to-be built database management system saver.

12. A computerized method according to claim 3 wherein the database management system sever hardware requirement includes a number of processors for the yet-to-be built database management system server.

13. A computerized method according to claim 3 wherein the database management system server hardware requirements includes I/O requirements for the yet-to-be built database management system server.

14. A computerized method according to claim 3 wherein the database management system server hardware requirements includes memory requirements for the yet-to-be built database management system server.

15. Computer executable code stored on machine readable media for determining computer hardware requirements for a yet-to-be built database management system server using a user defined workload, the computer executable code performing the steps of:

obtaining from a user a plurality of transaction definitions, wherein each of said transaction definitions have a transaction workload contribution and an expected execution rate per second;

determining a total expected workload as a function of said transaction definitions; and determining the database management system server hardware requirements for the yet-to-be built database management system server as a function of said total expected workload.

* * * * *

UNITED STATES PATENT AND TRADEMARK OFFICE
CERTIFICATE OF CORRECTION

PATENT NO. : 6,957,209 B1 Page 1 of 1
DATED : October 18, 2005
INVENTOR(S) : John M. Quernemoen It is certified that error appears in the above-identified patent and that said Letters Patent is hereby corrected as shown below:

Column 15,
Line 42, "saver" should read -- server --.

Column 16,
Line 8, "on" should be -- transaction --.
Line 59, "saver" should read -- server --.

Signed and Sealed this

Twenty-seventh Day of December, 2005

JON W. DUDAS
*Director of the United States Patent and Trademark Office*